United States Patent [19]
Seely et al.

[11] Patent Number: 4,648,169
[45] Date of Patent: Mar. 10, 1987

[54] METHOD OF MOUNTING UNIVERSAL MOUNTING BRACKET FOR GAS PUMP TOPPERS

[75] Inventors: James R. Seely, Rochester; David U. Hillstrom, Novi, both of Mich.

[73] Assignee: Marketing Displays, Inc., Farmington Hills, Mich.

[21] Appl. No.: 825,634

[22] Filed: Mar. 26, 1986

Related U.S. Application Data

[62] Division of Ser. No. 600,825, Apr. 16, 1984.

[51] Int. Cl.[4] .............................................. B23P 19/00
[52] U.S. Cl. .................................................. 29/526 R
[58] Field of Search .............. 29/526 R; 248/65, 476, 248/27.8, 287, 295.1; 256/65; 40/592, 606, 609

[56] References Cited

U.S. PATENT DOCUMENTS

| | | | |
|---|---|---|---|
| 2,627,683 | 4/1984 | Leander . | |
| 2,783,367 | 2/1957 | Locke | 248/287 X |
| 2,852,222 | 9/1958 | Bogar | 248/295.1 |
| 2,983,472 | 5/1961 | Bowling | 248/27.8 |
| 3,330,518 | 7/1967 | Adler | 29/526 R X |
| 3,433,448 | 3/1969 | Weber | 248/476 |
| 3,838,842 | 10/1974 | McCracken | 248/476 |
| 4,169,308 | 10/1979 | Minoque | 29/526 R X |
| 4,346,872 | 8/1982 | Tornya | 256/65 |

FOREIGN PATENT DOCUMENTS 2069738 8/1981 United Kingdom .

*Primary Examiner*—Charlie T. Moon
*Attorney, Agent, or Firm*—Harness, Dickey & Pierce

[57] ABSTRACT

An adjustable, universal mounting bracket and system for securing signs and poster display devices to the top of gasoline pump fixtures without the need to drill holes or use adhesives. The mounting bracket may be readily assembled from selected components of a kit to fit many, if not all, popular makes and models of gas pumps. For economical merchandising, one kit fits all and the components of the kit are compactly stored and shipped disassembled. Unused components are thrown away.

5 Claims, 22 Drawing Figures

METHOD OF MOUNTING UNIVERSAL MOUNTING BRACKET FOR GAS PUMP TOPPERS

This is a division of application Ser. No. 600,825, filed Apr. 16, 1984.

BACKGROUND AND SUMMARY OF THE INVENTION

The present invention relates generally to adjustable mounting brackets for signs and poster display devices for use on gas pump fixtures. More particularly, the invention relates to a universal mounting bracket and system which will fit a wide variety of gas pump makes and models and which may be assembled from a plurality of components selected from a kit.

There are numerous sign stands and poster display devices known today which are used for displaying various signs and messages for advertisement and information to the public. In filling stations or gas stations, it is quite common to position signs or poster display devices on top of the gas pump fixtures in order to advertise gasoline prices or to advertise other goods, promotional items or services being offered at the station. In practice there is a wide variety of different makes and models of gas pump fixtures, in all shapes and sizes. Thus finding a way to secure a sign or poster display device to the top of a gas pump and in particular to a variety of pump tops of different makes and models is not a simple problem.

The problem is further compounded by the fact that mounting holes may not be drilled in the top of most gas pumps without voiding the manufacturer's warranty or possibly creating weather damage problems. Most, if not all, present day gas pumps employ sophisticated electronic circuitry, housed within the upper portion of the pump enclosure or housing, which must not be subjected to water leakage. For this reason, most gas pump manufacturers provide no mounting holes in the top of the gas pump, and instruct their customers not to drill any holes.

To avoid drilling holes, the widely accepted prior art solution has been to secure the sign or display device to the top of the gas pump using double sided adhesive tape. However, double sided tape cannot be effectively applied below 40° Fahrenheit and the tape is quite difficult to remove once it has adhered to the top of the pump. This makes routine cleaning and maintenance of the gas pump more difficult. Stubborn double sided tape can often be removed only by scraping or by using strong solvents. Either of these removal methods can scratch or mar the pump's finish. Moreover, since double sided tape adhesions are exposed to weather, and occasionally to gasoline, petroleum products and other solvents, they tend to weaken over time and are apt to fail under heavy wind loading.

Mechanical mounting brackets of the prior art which do not rely on double sided tape present problems of their own. Most problems stem from the fact that their is a wide variety of different makes and models of gas pumps, and no industry-wide standardization. It is not uncommon for one gas station or a chain of gas stations to use several different makes or models at the same site. Unless the display mounting bracket is ordered when the gas pumps are first purchased, it is often quite difficult to later obtain the proper mounting bracket for a particular gas pump, since gas pump model numbers describing the pump housing configuration are often not readily available. This makes it quite difficult for the filling station manager to purchase the necessary mounting bracket by telephone or mail.

It is therefore an object of the present invention to provide an improved mounting bracket and display device for holding and securing signs, posters and frames to gas pump fixtures of a wide variety of makes and models. It is a further object of the invention to provide, in kit form, the necessary components for assembly of a readily adaptable and adjustable mounting bracket which overcomes the problems heretofore known with existing mounting brackets of both the mechanically-secured and adhesively-secured types. It is a further object to provide a universal mounting bracket which will mechanically secure to the surface of a gas pump fixture, without adhesives and without the need to drill mounting holes. It is still a further object of the invention to provide a mounting bracket system which may be shipped or stored in a compact, disassembled state, and which may be readily assembled without special tools or skills at the filling station site.

In accordance with the invention, a mounting bracket for securing a display device to a fixture is provided which has a cross brace member defining a channel and adapted to receive the display device. In practice, two such cross braces are used to mount the display device. At least one slider member is provided for nesting assembly within each cross brace member, so that the slider member slides or telescopes within the channel defined by the cross brace member. Usually two slider members are used with each cross brace member so that they protrude from opposite ends of the cross brace. A clip is readily attachable to each slider member providing means for gripping the fixture. The cross brace, slider and clip components, so assembled, may be readily adjusted to grip the fixture and to thereby secure the display device to the pump.

BRIEF DESCRIPTION OF THE DRAWINGS

FIG. 18 is a cross-sectional view illustrating use of the invention on a first type of gas pump fixture, exemplifying those manufactured by A. O. Smith, or the like;

FIG. 19 is a cross-sectional view illustrating use of the invention on a second type of gas pump fixture, exemplifying those manufactured by Tokheim, or the like;

FIG. 20 is a cross-sectional view illustrating use of the invention on a third type of gas pump fixture, exemplifying those manufactured by Bennet, or the like;

FIG. 21 is a cross-sectional view illustrating use of the invention on a fourth type of gas pump fixture, exemplifying those manufactured by Gilbarco, or the like;

FIG. 22 is a cross-sectional view illustrating use of the invention on a fifth type of gas pump fixture, exemplifying those manufactured by Dresser Wayne, or the like.

DESCRIPTION OF THE PREFERRED EMBODIMENT

Figure 1:
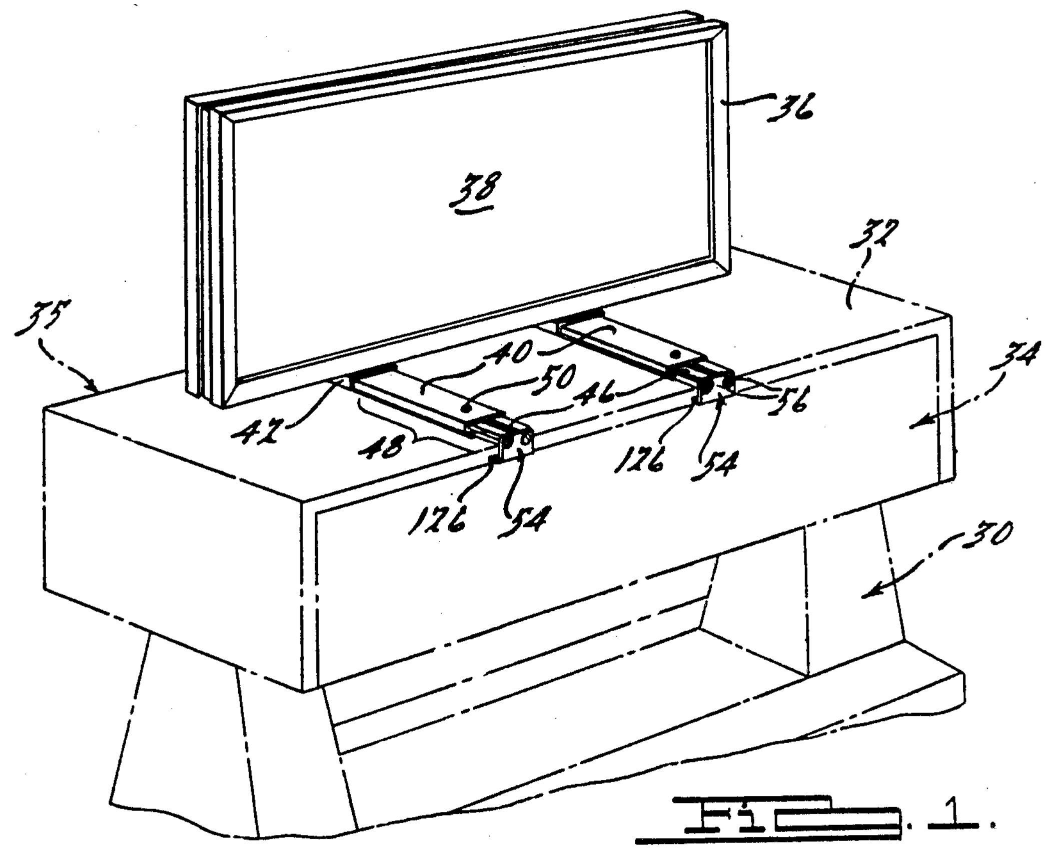
FIG. 1 is a perspective view of the mounting bracket and display device of the invention in use on an exemplary gas pump fixture.
Figure 2:
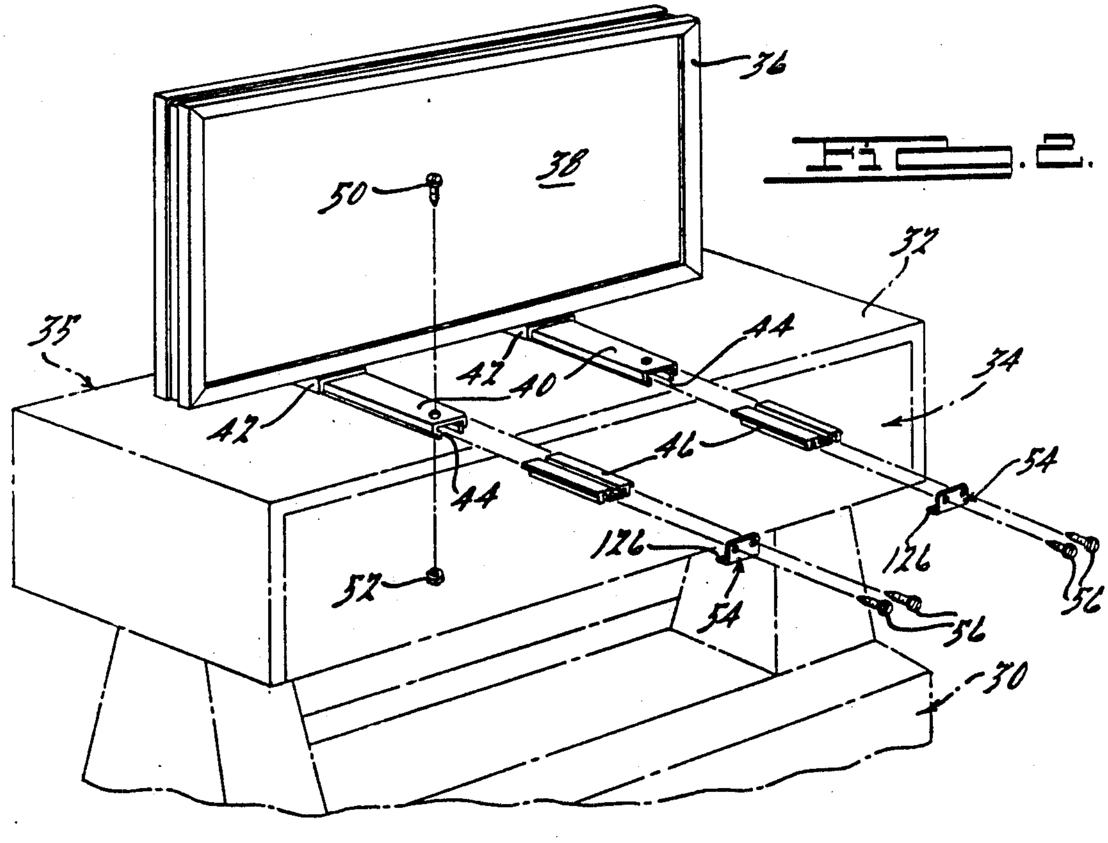
FIG. 2 is an exploded perspective view of the invention shown in FIG. 1.

The present invention provides a plurality of components, collected in the form of a kit, which may be assembled in a variety of different ways for mounting a poster display device or sign to a wide variety of different gas pump fixture makes and models. One such assembly is illustrated in FIGS. 1 and 2. Referring to FIGS. 1 and 2, a gas pump fixture is illustrated generally at 30. The gas pump fixture has a generally flat, upwardly presenting top surface 32 which forms part of the gas pump housing 34. Many gas pumps popular today employ delicate electronic circuitry contained within this gas pump housing. Accordingly, gas pump housing 34, including top surface 32, must be impervious to the elements so that the electronic circuitry will not be damaged by rain, snow or dust.

In FIGS. 1 and 2 a generally vertically arranged sign or display device 36 is illustrated in place atop top surface 32. Display device 36 provides a frame for securing a poster 38 or the like. In general, display device 36 may be implemented using a wide variety of different display device structures. These include top loading poster frames, which slidably receive the poster in a frame-forming channel accessed via an open top, and also include spring-loaded poster frames, which have spring-loaded sides that snap open for inserting the poster and then snap closed to clamp and secure the poster in place. For purposes of illustration, FIGS. 1 and 2 show a poster frame of the spring-loaded type. This is not to be considered as limiting the scope of the invention, as the invention is equally usable with many other types of signs, poster frames or display devices.

Before undertaking a detailed description of the components of the mounting bracket kit of the invention, a brief explanation of the invention in use in an exemplary embodiment may be helpful. FIG. 1 illustrates such an exemplary embodiment, in which a pair of cross brace members 40 are attached to display device 36 by a pair of bracket members 42. Each cross brace member has a pair of opposing open ends. One such open end 44 of each cross brace member 40 may be seen in FIG. 2. The open ends are adapted to slidably or telescopically receive extruded slider members 46. In the exemplary embodiment of FIGS. 1 and 2, each cross brace member 40 receives a pair of slider members 46, one in each open end. The cross brace member and pair of slider members so assembled define crosspiece 48 of readily adjustable length. Bracket members 42 are slidably carried on crosspiece 48, holding display device 36 in generally perpendicular relationship to crosspiece 48. Crosspiece 48 (and also the cross brace member 40 and slider members 46 which make up crosspiece 48) is adapted to rest flat upon top surface 32, providing a stable base for supporting the display device 36. Mating threaded fasteners 50 and 52 are provided for locking the slider member 46 within the cross brace member 40, to prevent telescopic movement of the slider member once the length of crosspiece 48 has been properly adjusted. Clip members 54 are secured to the outwardly presenting ends of slider members 46 by means of self-tapping threaded fasteners 56. The clip members are generally L-shaped and provide an inwardly directed (or outwardly directed) flange 126 for grabbing a sheet metal or plastic lip or ridge structure on the gas pump housing 34. For a more detailed understanding of the components which make up the kit of the present invention and their assembly with one another to define a universal mounting bracket, reference may be had to the remaining drawings and to the following further specification and examples of the invention in use.

FIGS. 1 and 2 only show part of the display mounting system in accordance with the present invention. First, it is understood that corresponding sets of slider members and clip members are positioned at the other (unshown) end of cross brace members 40 to hold the display device 36 securely in place on the top surface 32 of the gas pump 30. The slider members and clip member are the same as slider members 46 and clip members 54, respectively, and are used to grab the sheet metal or plastic lip or ridge structure on the opposite side 35 of the gas pump housing 34.

Secondly, it is understood that due to the wide variety of shapes and sizes of the gas pump makes and models on the market today, the lengths and configurations of the cross brace member 40, the slider members 46, and the clip members 54 may differ significantly from those shown in FIGS. 1 and 2.

Figure 3:
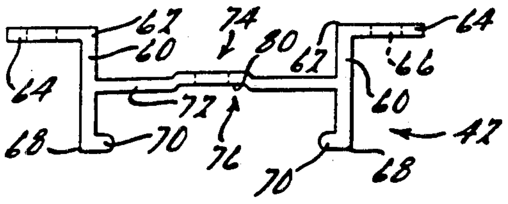
FIG. 3 is a cross-sectional view of the bracket member of the invention, used to secure the display device to the cross brace member of the invention.
Figure 4:
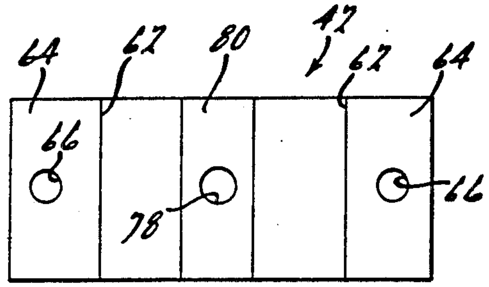
FIG. 4 is a plan view of the bracket of member of FIG. 3.

Referring now to FIGS. 3 and 4, the bracket member 42 will be discussed in further detail. Bracket member 42 has a pair of spaced apart and generally parallel side walls 60 which define a first pair of coplanar edges 62 having outwardly directed flanges 64 projecting therefrom. Each of the flanges 64 is provided with a mounting hole 66 for receiving a threaded fastener used to screw or bolt the display device 36 to the bracket member 42. When display device 36 and bracket member 42 are fastened together, flanges 64 provide a pair of flat coplanar surfaces for supporting the display device. Side walls 60 have a second pair of coplanar edges 68 which define inwardly projecting flanges 70. If desired, the inwardly projecting flanges may be fashioned to provide a pair of substantially coplanar surfaces which rest upon the top surface 32 of the gas pump fixture 30 when the assembled apparatus is in use.

Bracket member 42 further includes an inner connecting wall 72 which is generally parallel to flanges 64 and which joins together intermediate portions of side walls 60 to define a generally H-shaped configuration having first and second generally rectangular or U-shaped channels 74 and 76 opening in opposite directions. When in use, first channel 74 is located adjacent the display device 36 and provides a clearance space to accommodate the threaded fastener used to secure the bracket member and the cross brace member to one another. Second channel 76 is adapted to slidably receive a cross brace member 40, so that cross brace member 40 nests within the second channel. Interconnecting wall 72 is provided with a mounting hole 78 in the center thereof. Interconnecting wall 72 is also provided with an indented or recessed midsection 80 for providing clearance space to accommodate a threaded fastener. Bracket member 42, so described, may be manufactured from aluminum or other suitable material, preferably by extrusion. A typical mounting bracket system in accordance with the invention would normally include two such bracket members.

Figure 6:
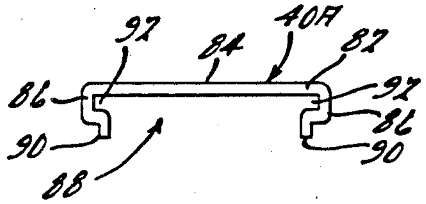
FIG. 6 is a cross-sectional view of the cross brace member of FIG. 5, taken substantially along the line 6—6.
Figure 5:
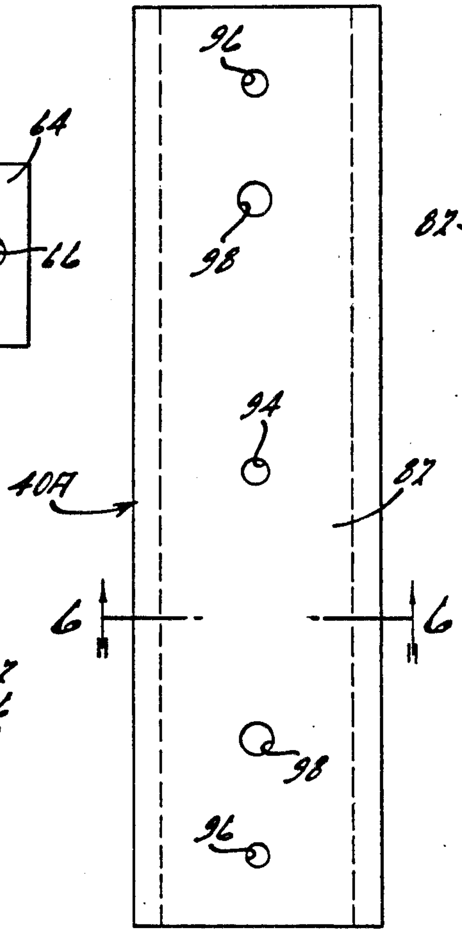
FIG. 5 is a plan view of a first cross brace member in accordance with the invention.
Figure 8:
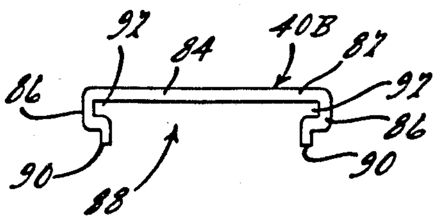
FIG. 8 is a cross-sectional view of the cross brace member of FIG. 7, taken substantially along the line 8—8.
Figure 7:
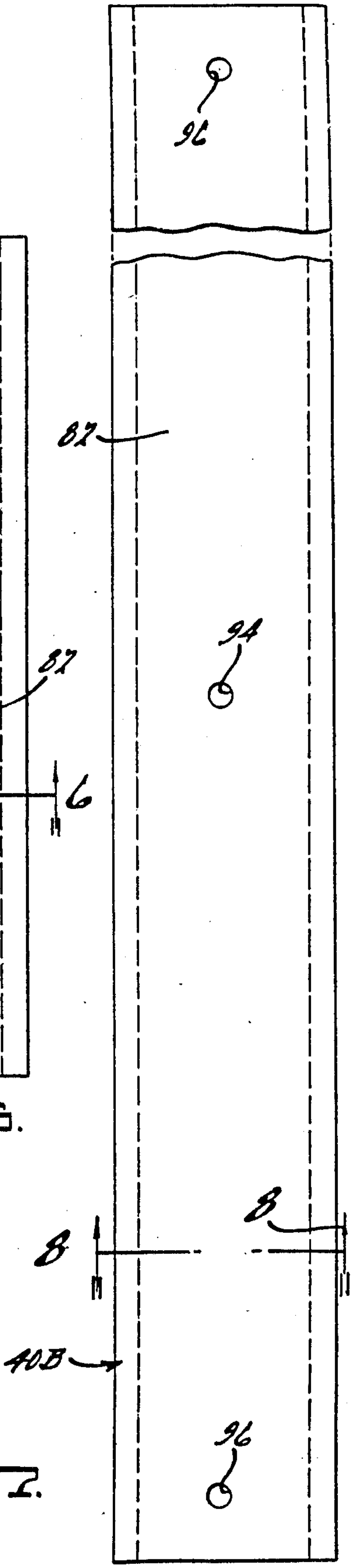
FIG. 7 is a plan view of a second cross brace member in accordance with the invention.

Referring now to FIGS. 5 through 8, the cross brace members of the invention will be described. More specifically, FIGS. 5 and 6 illustrate a first embodiment of cross brace member, hereinafter referred to as the short cross brace member 40A; FIGS. 7 and 8 illustrate a second embodiment of cross brace member, hereinafter referred to as the long cross brace member 40B. As seen in FIGS. 6 and 8, the cross sections of short cross brace member 40A and long cross brace member 40B are substantially the same. In the presently preferred embodiments, short cross brace member 40A is approximately 6.25 inches long, while long cross brace member 40B is approximately 13 inches long. Both long and short cross brace members may be fabricated from aluminum, such as 6063-T6 aluminum alloy, or another suitable material by extrusion or other means.

With reference to the cross sectional views of FIGS. 6 and 8, both short and long cross brace members comprise a longitudinally extending first wall 82 which presents a longitudinally extending, substantially flat exterior surface 84. Both cross members include longitudinally extending side walls 86 generally orthogonal to the first wall 82 and defining an elongated channel 88. Side walls 86 terminate in a pair of substantially coplanar edges 90 which, in use, rest against top surface 32 of the gas pump housing 34. Side walls 86 are formed as shown to define a pair of longitudinally extending, parallel recesses 92 which communicate with channel 88. Short cross brace member 40A includes a center hole 94, a pair of slider securing holes 96 at the extremities, and a pair of intermediate auxiliary holes 98. Long cross brace member 40B includes a center hole 94 and a pair of slider securing holes 96. The use of these various holes will be described more fully below.

Figure 10:
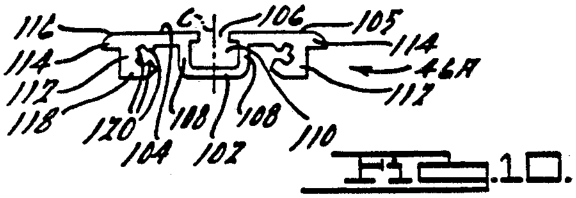
FIG. 10 is a cross-sectional view of the slider member of FIG. 9, taken substantially along the line 10—10.
Figure 12:
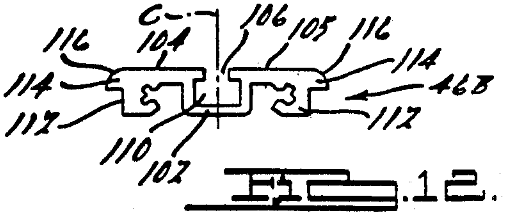
FIG. 12 is a cross-sectional view of the slider member of FIG. 11, taken substantially along the line 12—12.
Figure 9:
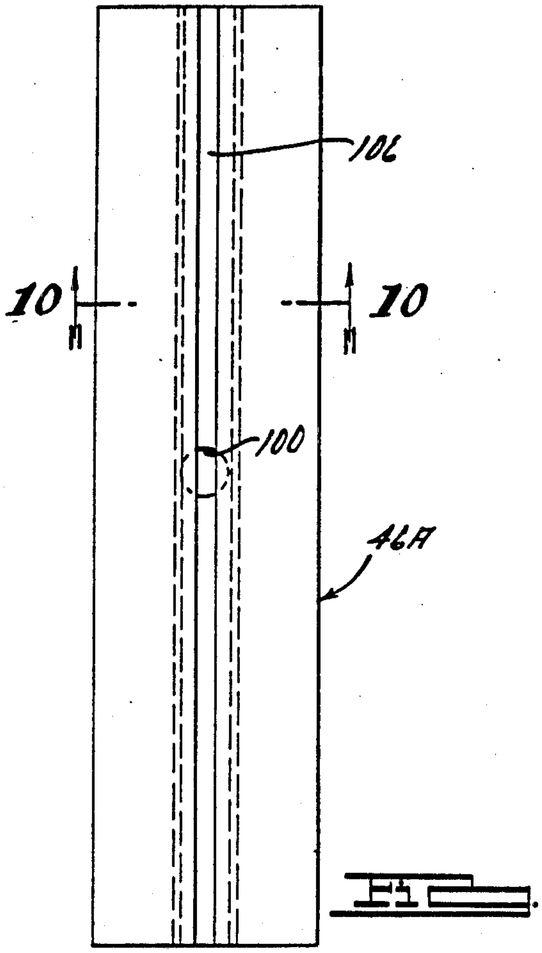
FIG. 9 is a plan view of a first slider member in accordance with the invention.
Figure 11:
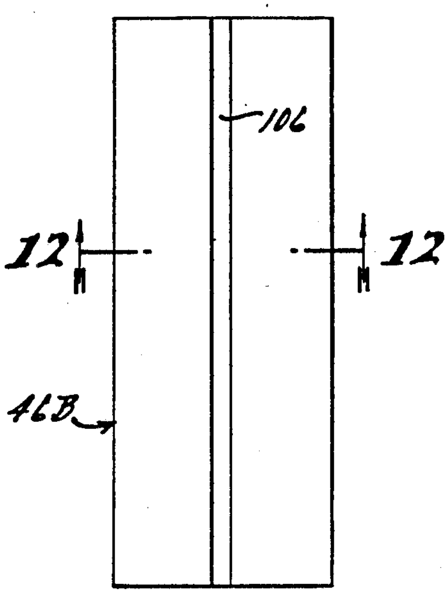
FIG. 11 is a plan view of a second slider member in accordance with the invention.

Referring now to FIGS. 9 through 12, two embodiments of slider members are illustrated and will now be described in greater detail. FIGS. 9 and 10 depict a first embodiment of slider, hereinafter referred to as the long slider member 46A. FIGS. 11 and 12 depict a second embodiment of slider member, hereinafter referred to as the short slider member 46B. As seen by comparing FIGS. 10 and 12, both embodiments of slider member have substantially the same cross section. In the presently preferred embodiment long slider member 46A is approximately 6.312 inches long, while short slider member 46B is approximately 3.812 inches long. Long slider member 46A is also provided with central bore 100 through central base wall 102. Central base wall 102 is best shown in the cross sectional view of FIG. 10.

Referring now to FIGS. 10 and 12, the cross section of both slider members will be seen to comprise first and second coplanar top walls 104 and 105, disposed in spaced relation to one another to define an elongated slotted opening 106. Slotted opening 106 is disposed along center line C about which each slider member is symmetrical. Downwardly depending from top walls 104 and 105 are a pair of intermediate walls 108 which join central base wall 102 to define an elongated longitudinally extending channel 110 which communicates with slotted opening 106. Also downwardly depending from top walls 104 and 105 are a pair of outer walls 112. As shown, top walls 104 and 105 extend laterally left and right of center line C beyond the outer walls 112, thereby defining a pair of outwardly directed flanges 114. Preferably flanges 114 have rounded upper edges 116, as shown. Outer walls 112 are provided with inwardly directly flanges 118 which are generally coplanar with central base wall 102. Flanges 118, outer walls 112 and top walls 104 and 105 are each formed with longitudinally extending ribs 120 which are disposed in space relation to one another about a generally closed locus. Preferably ribs 120 are spaced generally equidistant from one another about a circular or triangular locus. Ribs 120 are spatially arranged to receive a self-tapping screw used in securing a clip member to the end of the slider member.

In the presently preferred embodiments slider members 46A and 46B are extruded from aluminum, such as 6063-T6 aluminum alloy or other suitable material. In the presently preferred universal mounting bracket kit, two pairs of long slider members 46A and two pairs of short slider members 46B are normally provided. Central bore 100 of long slider member 46A communicates with longitudinally extending channel 110 for use in some applications. Short slider member 46B is not presently provided with a similar central bore, although one might be provided without departing from the scope of the invention as set forth in the appended claims.

Figure 14:
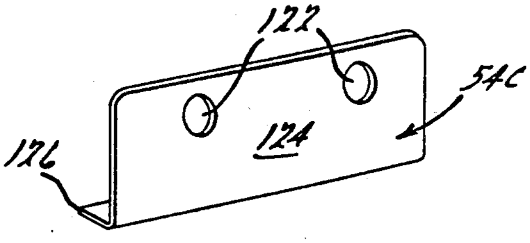
FIG. 14 is a perspective view of a second clip member in accordance with the invention.
Figure 13:
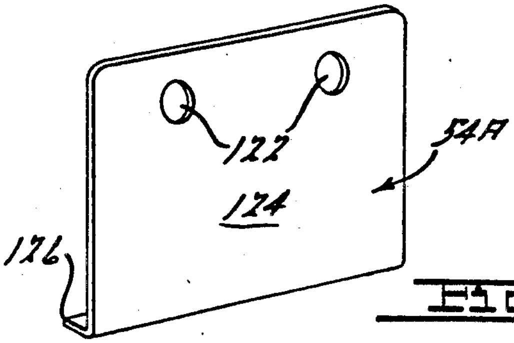
FIG. 13 is a perspective view of a first clip member in accordance with the invention.
Figure 18:
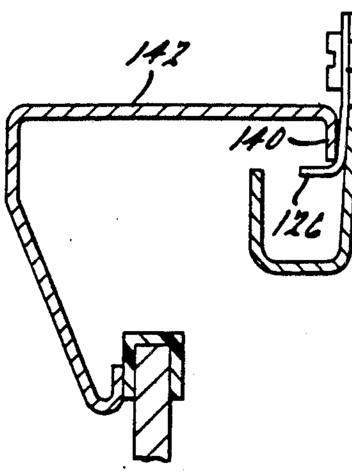
Figure 19:
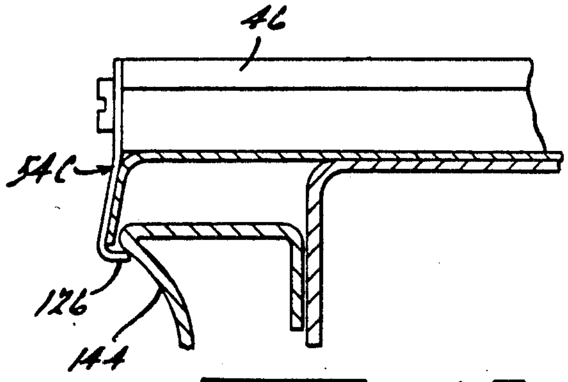
Figure 20:
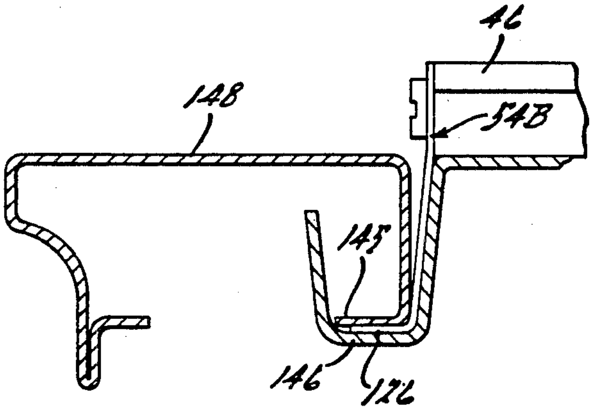
Figure 21:
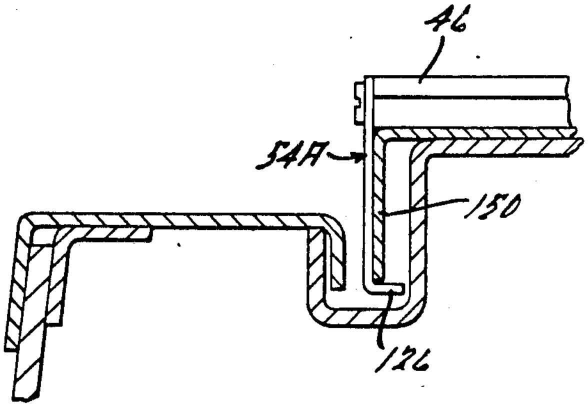
Figure 22:
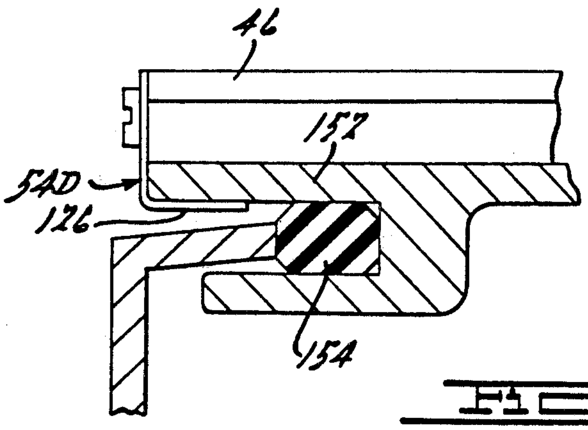

FIGS. 13 and 14 illustrate two embodiments of clip members in accordance with the present invention. FIG. 13 illustrates a first embodiment of clip member, hereinafter referred to as long clip member 54A. FIG. 14 illustrates a second embodiment of clip member, hereinafter the short clip member 54C. Both clip members are generally L-shaped and provide a pair of mounting holes 122. More specifically, clip members 54A and 54C comprise a first portion 124 providing an end plate for closing the exposed end of the slider member to which the clip is attached, and a second flanged portion 126 for gripping the gas pump fixture. Preferably the clips are fabricated from stainless steel. In the presently preferred universal mounting bracket kit, two pairs, each, of four different clip configurations are provided, for a total of sixteen clips. Clips 54A and 54C of FIGS. 13 and 14, respectively, comprise two such configurations. As will be described more fully below, clip configuration 54A is also shown in FIG. 21, and clip 54C is also shown in FIGS. 18 and 19. In addition, FIG. 20 illustrates a third clip configuration, clip 54B, and FIG. 22 illustrates a fourth clip configuration, clip 54D. Clip 54B is of the generally long variety, similar to clip 54A; while clip 54D is of the short variety, similar to clip 54C. As will be explained below, the particular clips selected for a given application depend on the make and model of gas pump fixture to which the mounting bracket is to be attached. Accordingly, the dimensions of the first portion 124 and second flange portion 126 of each type of clip member are determined by the configuration and dimensions of the lip of ridge structure of the gas pump fixture. Preferably, all four types of clip members are relatively thin and resilient so that they may be inserted between or around sheet metal or plastic components of the gas pump housing without deforming those components or damaging the water seals.

From the foregoing it will be understood that the presently preferred universal mounting bracket kit includes a complement of major component parts set forth in Table I below together with an assortment of threaded fasteners, machine screws, hex nuts and the like, for assembly of the bracket structure. After assembling the appropriate bracket, the remaining components may be discarded.

TABLE I

| Component Cross Brace Members | Number In Kit: |
|---|---|
| Long cross brace members | 2 |
| Short cross brace members | 2 |
| Long slider members | 4 |
| Short slider members | 4 |
| Clip members | |
| Type 54A | 4 |
| Type 54B | 4 |
| Type 54C | 4 |
| Type 54D | 4 |

One advantage of the present invention is that the component parts may be packaged and shipped disassembled to minimize shipping container size and shipping costs. Each kit contains the proper assortment of components from which a variety of mounting brackets may be readily assembled, to accommodate at least twenty-five different makes and models of gas pump fixtures. Since one kit will accommodate at least twenty-five different makes and models of gas pumps, mail orders or telephone orders can be handled economically without trained personnel acquainted with gas pump manufacturers model numbers or dimensions. Similarly, the gas station attendant placing the order need not ascertain make and model numbers before placing the order. The economy of the universal mounting bracket kit of the invention is substantial. The cost savings, resulting from greatly simplified inventory control, foolproof mail order or telephone order mechandising, and the elimination of wrong order returns, more than make up for the additional cost of supplying the universal kit with unused components to be thrown away.

Figure 15:
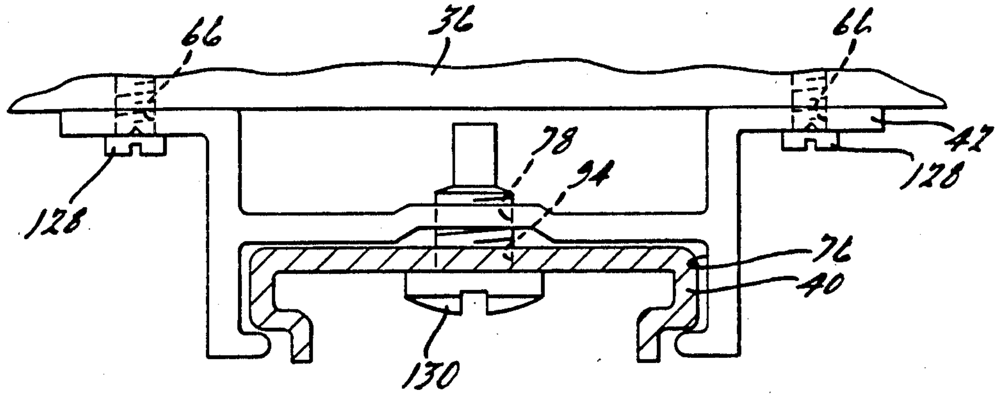
FIG. 15 is a cross-sectional view illustrating a bracket member in assembly with a cross brace member.
Figure 16:
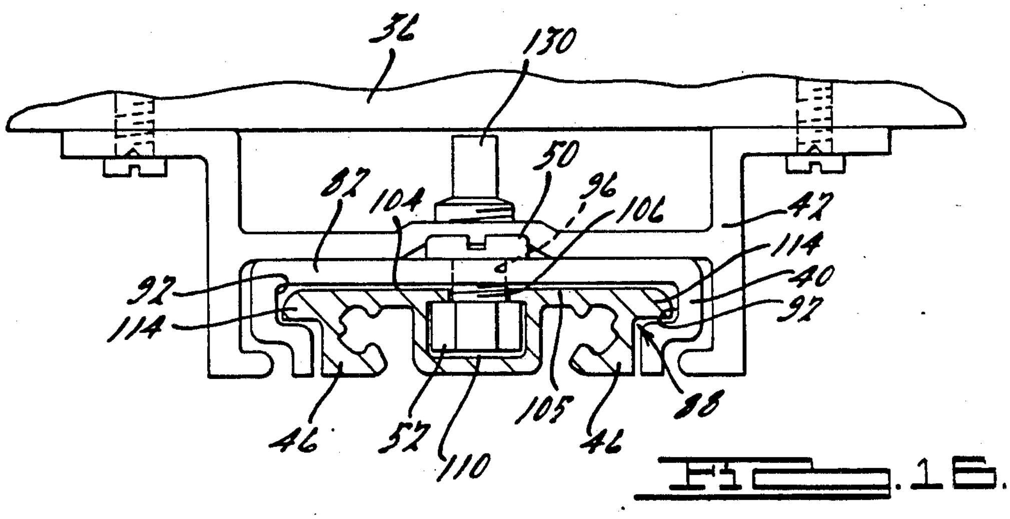
FIG. 16 is a cross-sectional view illustrating a bracket member, cross brace member, and slider member in assembly with one another.
Figure 17:
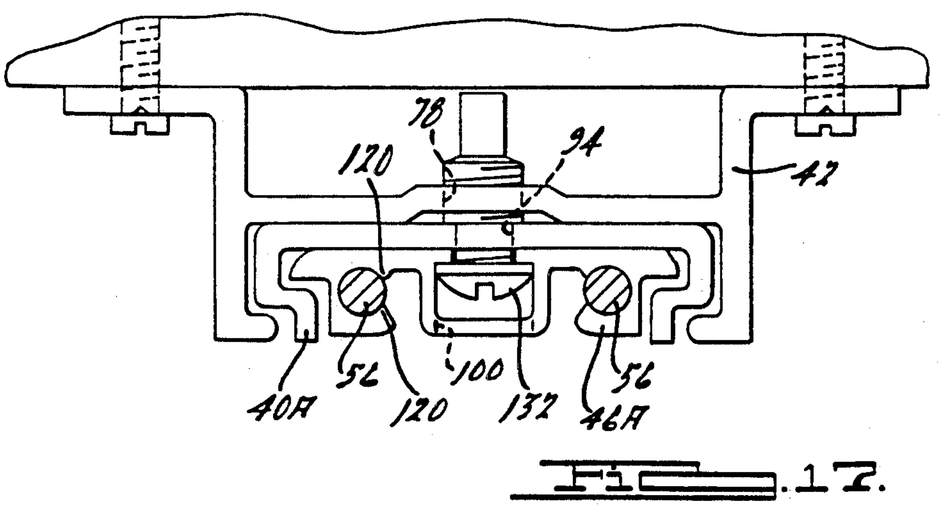
FIG. 17 illustrates an alternate way of assembling the bracket member, cross brace member and slider member of the invention.

Referring now to FIGS. 15, 16 and 17, assembly of the display device mounting bracket in accordance with the inventive method will now be described. FIG. 15 illustrates the way in which bracket member 42 is secured to display device 36 by means of threaded fasteners 128, or the like, inserted through mounting holes 66 of bracket member 42. FIG. 15 further illustrates the way in which cross brace member 40 is slidably or telescopically inserted into channel 76 of bracket member 42. Cross brace attachment fastener 130 is inserted through the center hole 94 of cross brace member 40 and threadedly secured into hole 78 of bracket member 42 to secure the bracket member and cross brace member together. Cross brace attachment 130 may then be tightened to draw the bracket member 42 and cross brace member 40 into touching engagement with one another. FIG. 15 illustrates an intermediate step in the assembly process prior to fully tightening fastener 130.

In practice, the particular cross brace member selected (i.e., short cross brace member 40A or long cross brace member 40B) will depend upon the size or dimensions of the gas pump fixture to which the display device is being attached. Table II (below) sets forth the pump top dimensions of a variety of different commercially available gas pump fixtures and gives the proper mounting bracket component selections for those fixtures. It will be understood, however, that the selections designated in Table II are exemplary of the presently preferred mounting bracket kit embodiment and should not be taken as a limitation upon the scope of the invention as set forth in the appended claims.

FIG. 16 illustrates a later stage in the assembly of a universal mounting bracket in accordance with the invention. In FIG. 16 cross brace attachment fastener 130 has been fully tightened, drawing cross brace member 40 into touching engagement with bracket member 42. The display device 36, bracket member 42 and cross brace member 40 having thus been secured to one another, slider members 46 are now added to the assembly. With reference back to FIG. 2, it will be seen that slider members 46 are inserted into both open ends of each cross brace member 40. Before inserting slider member 46 into cross brace member 40, however, a first threaded fastener 50 is inserted through slider securing hole 96 and a second threaded fastener 52 is then loosely threaded into engagement with fastener 50. In the presently preferred embodiment threaded fastener 50 in a machine screw, while fastener 52 is a hex nut; although other types of fasteners may be employed.

With fasteners 50 and 52 loosely attached, slider member 46 is now inserted into channel 88 of cross brace member 40. Flanges 114 mate with recess 92 to retain slider member 46 in nesting relationship with cross brace member 40. Threaded fastener 52 is slidably received within the longitudinally extending channel 110, with slotted opening 106 providing the clearance space for accommodating fastener 50 and for permitting reciprocating sliding movement. The bracket member and pair of slider members, so assembled, comprise an adjustable length crosspiece, shown generally by reference numeral 48 in FIG. 1. Once the proper length has been determined and adjusted by sliding slider member 46 inwardly or outwardly, the threaded fasteners 50 may then be tightened, causing corresponding fastener 52 to be drawn into tight clamping engagement with top walls 104 and 105. Top walls 104 and 105 are in turn drawn into tight, non-slipping engagement with the underside of cross brace wall 82. In practice, either the long slider member 46A or the short slider member 46B will be selected from the kit in accordance with the size and dimensions of a particular gas pump fixture. Reference may be had to Table II below for such selections.

TABLE II

| For: Pump Top Widths | Use: Cross Brace | Slider |
|---|---|---|
| 6-5/16" | short | (1) long |
| 8"-12" | short | (2) short |
| 13"-24" | long | (2) long |

Having locked the slider members to their respective cross brace member, clip members 54 may now be selected and attached. As with the other components, clip members 54 are selected in accordance with the size, dimensions and construction of a particular gas pump fixture. Table III below may be consulted for selecting the appropriate clip member. The clip members are attached by inserting self tapping sheet metal screws 56 through mounting holes 122 and by deformably tapping or threading screws 56 into the screw boss defined by ribs 120, as shown in FIG. 17. Once the clip members have been attached to the slider members, the completed cross-piece may be placed upon the top surface 32 of the gas pump fixture 30. The clips are used to secure the crosspiece assembly to the fixture as will be discussed below in connection with FIGS. 18 through 22. If desired, one or more of the fasteners 50 may be temporarily loosened to make minor length adjustments to the crosspiece.

TABLE III

| For: | Use: Clip |
|---|---|
| A.O. Smith Pump | 54C |
| Models U-501 | (See FIG. 18) |
| U-502 | |
| DUEA-501 | |
| DUEA-502 | |
| L-101 | |
| Tokheim Pump | 54C |
| Models 162-L | (See FIG. 19) |
| 162-FL | |
| Tokheim Pump | 54C |
| Model 1250-A | |
| Bennet Pump | 54B |
| Series 4000 (lighted) | (See FIG. 20) |
| Series 4000 (unlighted) | |
| Bennet Pump | 54B |
| Series 6000 | |
| Gilbarco Pump | 54A |
| Model 164 | (See FIG. 21) |
| Gilbarco Pump | no clip required |
| Models AC-4921 | |
| AC-5921 | |
| Southwest Pump | 54D |
| Model 540-MTS-M3 | |
| Dresser Wayne Pump | 54D |
| Models DL-367-IL-19 | (See FIG. 22) |
| DL-362-IL-19 | |
| DL-361-IL-19 | |
| DL-371-IU-19 | |
| DL-380-IU-19 | |
| DL-377-IU-19 | |
| DL-373-IU-19 | |
| 367-1-Il | |

With reference to Table II above, for pump top widths of 6-5/16" only one slider member is used with each cross brace member. Long slider member 46A is longer than short cross brace member 40A, hence in this assembly the single slider member extends from both ends of the cross brace member. For this assembly a somewhat different arrangement of component parts is employed. FIG. 17 illustrates this arrangement. With reference to FIG. 17 a single threaded fastener 132 is inserted through the central bore 100 of slider member 46A so that it passes upwardly through slotted opening 106, through center hole 94 of cross brace 40A, for threaded insertion into hole 78 of bracket member 42. Threaded fastener 132 may then be tightened by reaching through central bore 100 with a screw driver or other suitable tool.

Referring now to FIGS. 18 through 22, with further reference to Table III, installation of the universal mounting bracket for a variety of different gas pump models is illustrated. Table III relates FIGS. 18 through 22 to particular gas pump models. A review of Table III reveals that Gilbarco pump models AC-4921 and AC-5921 require no clip members. The universal bracket assembly for these particular two gas pump models utilizes a pair of short cross brace members 40A without slider members or clips. The cross brace members are secured directly to the top of those gas pump models using machine screws inserted through the intermediate auxiliary holes 98 for threading directly into the pump top housing. These models are provided with specially sealed, water tight threaded members for this purpose.

Referring now to FIG. 18, clip member 54C is secured to slider member 46 with flanged portion 126 directed outwardly. Flanged portion 126 engages a down turned edge 140 of lip structure 142 to prevent the assembled mounted bracket from being lifted upwardly or being removed.

FIG. 19 illustrates clip member 54C attached to slider member 46 with flanged portion 126 directed inwardly to engage bezel 144. Flange portion 126 thus similarly prevents the mounting bracket from being lifted upwardly or removed. Also note in FIG. 19 that the main body portion of clip 54C is bent slightly to accommodate final positioning and fastening. As indicated earlier, the clips 54A–D are preferably made of relative thin sheet metal and thus can be bent or formed in the appropriate shape during installation.

FIG. 20 illustrates clip member 54B attached to slider member 46 with the flanged portion 126 directed outwardly for sandwiched engagement between first and second portions 145 and 146 of lip structure 148. Note also that the main body portion of clip 54B is bent slightly.

FIG. 21 illustrates clip member 54A attached to slider member 46 with its flanged portion 126 directed inwardly to engage overhanging flanged lip structure 150.

FIG. 22 illustrates clip member 54D attached to slider member 46 with its flanged portion 126 directed inwardly to hook around and under upper wall 152. It will be seen that the flanged portion 126 is short enough to avoid interference with the rubber water seal 154 of the pump structure.

The foregoing examples of FIGS. 18 through 22 have illustrated the invention in use on a variety of different gas pump makes and models. It is to be understood that these examples are for purpose of illustrating the invention in use and should not be construed as limitations on the scope of the appended claims. Accordingly, while the above description constitutes the preferred embodiment of the present invention, it will be appreciated that the invention is susceptible to modification, variation and change without departing from the proper scope or fair meaning of the accompanying claims.

I claim:

1. A method of mounting a display device to a fixture comprising:

selecting a cross brace member from a plurality of cross brace members of different lengths, said selection based on the size of said fixture, and wherein each of said cross brace members defines a channel and has attachment means for attaching to said display device and further has a first hole communicating with said channel;

attaching said cross brace member to said display device using said attachment means;

inserting a first threaded fastener through said first hole of said selected cross brace member and threadedly attaching a second threaded fastener to said first fastener without fully tightening;

selecting a slider member from a plurality of slider members of different lengths, said selection based on the size of said fixture, and wherein each of said slider members is adapted for slidably nesting within said channel of said cross brace members and defines an elongated second channel adapted for slidably capturing said second fastener;

sliding said selected one of said slider members into said channel of said selected one of said cross brace members while slidably inserting said second fastener into said second channel to define an adjustable length crosspiece;

positioning said selected cross brace member on said fixture;

attaching a clip member to an end of said slider member;

adjusting the length of said crosspiece by sliding said slider member with respect to said cross brace member so that said clip member engages said fixture; and tightening said first and second fasteners to one another to prevent further sliding movement of said slider member.

2. The method of claim 1 wherein said display device is provided with a bracket defining a second channel and said step of attaching said cross brace member to said display device comprises sliding said cross brace into said second channel.

3. The method of claim 2 wherein said bracket and said cross brace member are each provided with a mounting hole, and wherein said step of attaching said cross brace member to said display device further comprises:

aligning said mounting holes of said bracket and said cross brace member, inserting a third fastener through said aligned mounting holes, and threadedly securing said third fastener.

4. The method of claim 1 further comprising:

selecting a second slider member from said plurality of slider members;

sliding said second slider member into said channel of said selected one of said cross brace members;

securing said second slider member with respect to said cross brace member; and attaching a second clip member to an end of said second slider member.

5. The method of claim 1 wherein each of said cross brace members has a second hole communicating with said channel and further comprising:

inserting a third threaded fastener through said second hole of said selected cross brace member and threadedly attaching a fourth threaded fastener to said third fastener without fully tightening;

selecting a second slider member from said plurality of slider members;

sliding said second slider member into said channel of said selected one of said cross brace members while slidably inserting said fourth fastener into said second channel of said second slider member;

attaching a second clip member to an end of said second slider member;

adjusting the position of said second slider member relative to said fixture so that said second clip member engages said fixture; and tightening said third and fourth fasteners to one another to prevent sliding movement of said second slider member.

* * * * *

UNITED STATES PATENT AND TRADEMARK OFFICE

CERTIFICATE OF CORRECTION

PATENT NO. : 4,648,169

DATED : March 10, 1987

INVENTOR(S) : James R. Seely

It is certified that error appears in the above-identified patent and that said Letters Patent is hereby corrected as shown below:

Column 2 line 49 "bracket of" should be --bracket-.

Column 6 line 25 "space" should be --spaced--.

Column 7, line 5 "of ridge" should be --or ridge--.

Column 7, line 49 "mechandising" should be --merchandising--.

Column 8, line 31 "in" should be --is--.

Column 8, line 46 "member" should be --members--.

Signed and Sealed this

Sixth Day of October, 1987

*Attest:*

DONALD J. QUIGG

*Attesting Officer*

*Commissioner of Patents and Trademarks*